United States Patent
Asai

(10) Patent No.: US 7,948,517 B2
(45) Date of Patent: May 24, 2011

(54) VEHICULAR IMAGE DISPLAY APPARATUS AND VEHICULAR IMAGE DISPLAY METHOD

(75) Inventor: Goro Asai, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 1096 days.

(21) Appl. No.: 10/793,823

(22) Filed: Mar. 8, 2004

(65) Prior Publication Data

US 2004/0196368 A1 Oct. 7, 2004

(30) Foreign Application Priority Data

Apr. 2, 2003 (JP) ................................. 2003-099612

(51) Int. Cl.
*H04N 7/18* (2006.01)
(52) U.S. Cl. ......................................... 348/143; 348/148
(58) Field of Classification Search .................. 348/148, 348/143
See application file for complete search history.

(56) References Cited

U.S. PATENT DOCUMENTS

| | | | | |
|---|---|---|---|---|
| 6,611,202 | B2 * | 8/2003 | Schofield et al. | 340/461 |
| 2002/0196340 | A1 * | 12/2002 | Kato et al. | 348/148 |
| 2003/0040851 | A1 * | 2/2003 | Ichikawa et al. | 701/1 |
| 2003/0103142 | A1 * | 6/2003 | Hitomi et al. | 348/148 |

FOREIGN PATENT DOCUMENTS

| | | |
|---|---|---|
| DE | 100 36 875 A1 | 2/2002 |
| EP | 1 321 334 A2 | 6/2003 |
| GB | 2 307 133 A | 5/1997 |
| JP | A 60-214691 | 10/1985 |
| JP | A 4-274941 | 9/1992 |
| JP | A 09-202180 | 8/1997 |
| JP | A 10-258682 | 9/1998 |
| JP | A 2001-130324 | 5/2001 |
| JP | A 2001-331789 | 11/2001 |
| JP | B2 3352096 | 9/2002 |
| JP | A 2004-194071 | 7/2004 |

* cited by examiner

*Primary Examiner* — Marsha D Banks Harold
*Assistant Examiner* — Chikaodili E Anyikire
(74) *Attorney, Agent, or Firm* — Oliff & Berridge, PLC

(57) ABSTRACT

A camera is disposed on a door mirror whose operating position is changeable between a deployed position and a retracted position, so that the positional relationship of the camera with a vehicle body changes as the operating position of the door mirror changes. A region corresponding to the operating position of the door mirror is partially extracted from the entire shot area of an image taken by the camera. That is, the angular direction of the region partially extracted from the entire shot area taken by the camera when the door mirror is in the deployed position and the angular direction of the region partially extracted from the entire shot area taken by the camera when the door mirror is in the retracted position are made different from each other by an angle equal to the angle difference between the two positions of the door mirror. The camera-taken images of the extracted regions are conformed to the screen of a display. Thus, the vehicle traveling direction appearing on the display remains unchanged regardless of changes in the operating position of the door mirror.

22 Claims, 6 Drawing Sheets

SHOT AREA   VEHICLE

← $\theta_1 = 0°$

SHOT AREA   VEHICLE

DISPLAY 12   VEHICLE

SHOT AREA   VEHICLE

DISPLAY 12   VEHICLE

VEHICULAR IMAGE DISPLAY APPARATUS AND VEHICULAR IMAGE DISPLAY METHOD

INCORPORATION BY REFERENCE

The disclosure of Japanese Patent Applications No. 2003-99612 filed on Apr. 2, 2003, including its specification, drawings and abstract, is incorporated herein by reference in its entirety.

BACKGROUND OF THE INVENTION

1. Field of the Invention

The invention relates to a vehicular image display apparatus and method, more particularly, to a vehicular image display apparatus that is equipped with a camera disposed on a movable portion of a vehicle, for example, an outer mirror or the like, and that is suitable for displaying images of surroundings of the vehicle taken by the camera on a display means, and a vehicular image display method therefor.

2. Description of the Related Art

Known vehicular image display apparatuses are equipped with a camera disposed on a vehicle, and display images of surroundings of the vehicle taken by the camera on a display device disposed at such a position that a vehicle occupant can see the displayed image (e.g., see Japanese Patent No. 3352096). In such an image display apparatus, a predetermined fixed region is extracted from shot image data provided via the camera, and the extracted fixed region is magnified and displayed on the display device. More specifically, while the vehicle is running backward or is at a stop, a fixed image region near the vehicle is extracted to be displayed on the display device. On the other hand, while the vehicle is running forward, a fixed image region remote from the vehicle is extracted to be displayed on the display device. Thus, in the above-described conventional display apparatuses, the regions of camera-shot image data which are displayed on the display device are automatically changed for the time of backward run or stop of the vehicle and the time of forward run of the vehicle.

In vehicles, cameras are disposed not only on sites or members whose posture is kept unchanged with respect to the vehicle body, but also on movable portions, such as an outer mirror or the like, whose posture changes with respect to the vehicle body. In an arrangement where a camera is disposed on a movable portion, the position of the camera changes with respect to the vehicle body in accordance with changes in the operating position of the movable portion. If in this arrangement the region of camera-taken image data which is extracted and displayed on the display device is fixed to a predetermined partial region as in an apparatus described in Japanese Patent No. 3352096, the direction of a main axis of a taken image displayed on the display device with respect to the vehicle body appearing in the displayed taken image when the operating position of the movable portion is a first position (deployed position) and the direction of the main axis of a taken image displayed on the display device with respect to the vehicle body appearing in the displayed taken image when the operating position of the movable portion is a second position (retracted position) become different from each other. This may sometimes cause vehicle occupants to have incorrect recognition of the environments around the vehicles.

SUMMARY OF THE INVENTION

It is an object of the invention to provide a vehicular image display apparatus and method capable of keeping the direction of the main axis of camera-taken images displayed on a display device with respect to the vehicle body appearing in the displayed images to a fixed direction regardless of changes in the operating position of a movable portion of the vehicle where the camera is disposed.

In accordance with a first aspect of the invention, a vehicular image display apparatus comprises a camera disposed on a movable portion of a vehicle, and displays a taken image of surroundings of the vehicle taken by the camera on display device visible to a vehicle occupant. The apparatus further comprises a controller that partially extracts a region corresponding to an operating position of the movable portion from taken image data provided via the camera and displays the region on the display device.

In the first aspect, the camera-taken image displayed on the display device is an image of the region partially extracted from the taken image data provided via the camera disposed on the movable portion of the vehicle in an extracting fashion corresponding to the operating position of the movable portion. That is, if the operating position of the movable portion changes, the region partially extracted from camera-taken image data is changed. If in this construction the angular directions of regions partially extracted are made different from each other by an angle corresponding to the operating angles of the movable portion, the direction of the main axis of a displayed image provided as a result of the picture shooting performed by the camera when the movable portion is at one operating position with respect to the vehicle body appearing in the displayed image on the display device and the direction of the main axis of a displayed image provided as a result of the picture shooting performed by the camera when the movable portion is at another operating position with respect to the vehicle body appearing in the displayed image on the display device will coincide with each other. Therefore, the direction of the main axis of camera-taken images displayed on the display device with respect to the vehicle body appearing in the displayed images can be kept unchanged regardless of changes in the operating position of the movable portion of the vehicle where the camera is disposed.

In the first aspect of the invention, the operating position of the movable portion may be selectively changeable between a first position and a second position, and a relative position of the camera with respect to a vehicle body may change in accordance with the operating position of the movable portion, and the controller may partially extract the region corresponding to the operating position of the movable portion from the taken image data provided via the camera in such an extracting fashion that a direction of a main axis of a taken image displayed on the display device with respect to the vehicle body appearing in the taken image displayed on the display device when the movable portion is at the first position and a direction of the main axis of a taken image displayed on the display device with respect to the vehicle body appearing in the taken image displayed on the display device when the movable portion is at the second position become the same.

Furthermore, in the first aspect, the operating position of the movable portion may be selectively changeable between a first position and a second position, and a relative position of the camera with respect to a vehicle body may change in accordance with the operating position of the movable portion, and the controller may make an angular direction of the region partially extracted from the taken image data provided via the camera at a time of the first position of the movable portion and an angular direction of the region partially extracted from the taken image data provided via the camera at a time of the second position of the movable portion different from each other by an angle corresponding to the first position and the second position of the movable portion.

In the above-described forms of the invention, if the vehicular image display apparatus further comprise a manual adjustment device that changes the direction of the main axis of the taken image displayed on the display device with respect to the vehicle body appearing in the taken image displayed on the display device through an operation performed by the vehicle occupant, or a manual adjustment device that changes the angular direction of the region partially extracted from the taken image data provided via the camera through an operation performed by the vehicle occupant, it becomes possible to adjust the direction of the main axis of taken images displayed on the display device with respect to the vehicle body appearing in the displayed taken images in accordance with the operation performed by a vehicle occupant.

In the above-described forms of the invention, the movable portion may be an outer mirror whose operating position is selectively changeable between a deployed position and a retracted position.

In accordance with a second aspect of the invention, a vehicular image display method takes a taken image of surroundings of the vehicle taken by a camera disposed on a movable portion of a vehicle, and displays the taken image on display device visible to a vehicle occupant. The method further comprises the steps of partially extracting a region corresponding to an operating position of the movable portion from taken image data provided via the camera and displaying the region on the display device.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
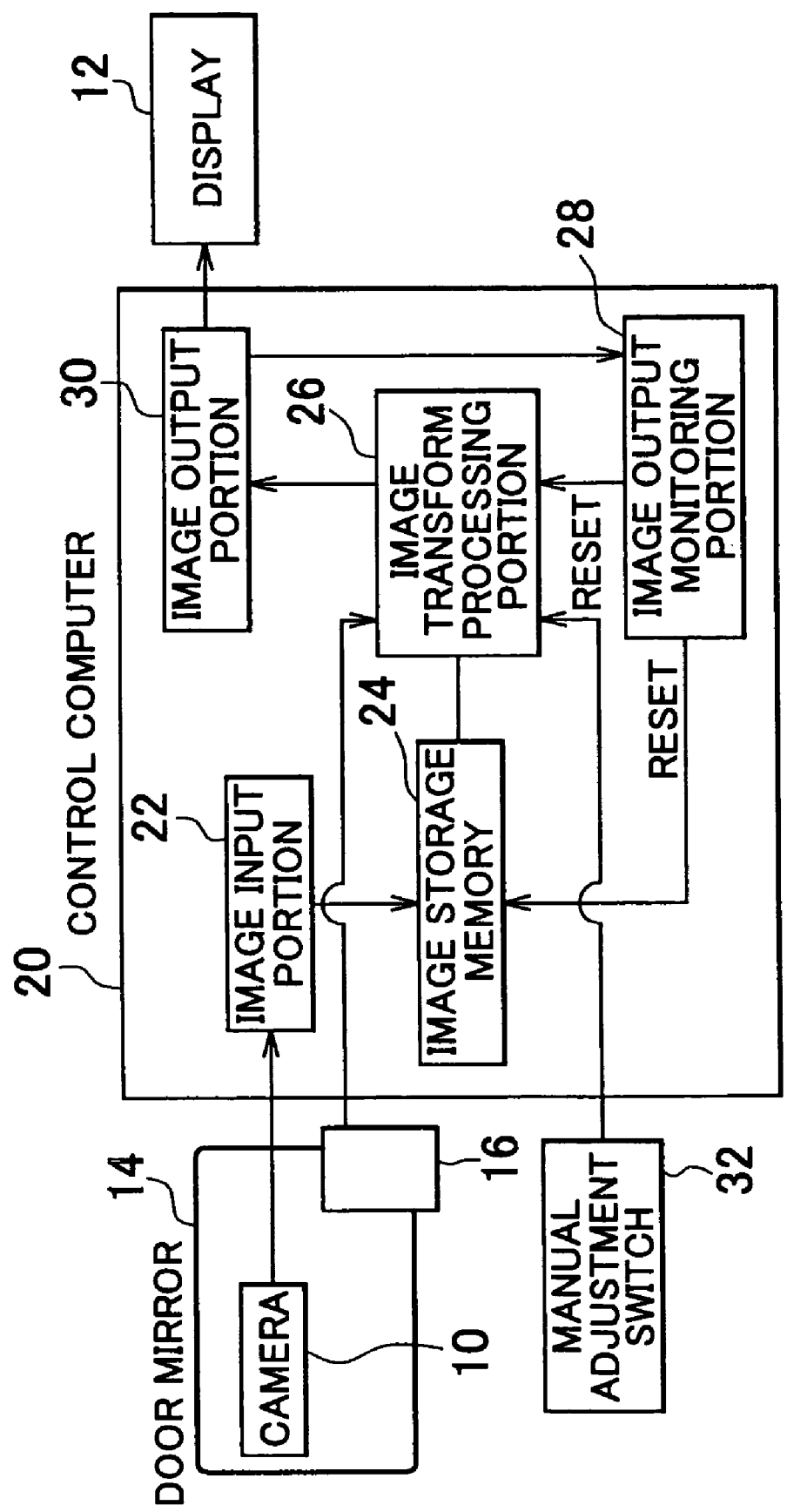
FIG. 1 is a diagram illustrating the system construction of a vehicular image display apparatus in accordance with an embodiment of the invention.

FIG. 1 is a diagram illustrating the system construction of a vehicular image display apparatus in accordance with an embodiment of the invention. The vehicular image display apparatus of this embodiment displays the surroundings of a vehicle in such a fashion that the surroundings can be visually recognized by an occupant of the vehicle, by using a camera mounted on the vehicle. In this embodiment, the vehicular image display apparatus has a camera 10 and a display 12.

The camera 10 is disposed on a door mirror 14, that is, an outer mirror, which is disposed on an openable-closable side door that is opposite from the driver's seat side. The door mirror 14 is a mirror retracting mechanism 16 for changing the operating position of the door mirror 14 in accordance with an operation performed by a vehicle occupant. The door mirror 14 is designed so that the operating position of the door mirror 14 is selectively changed by the mirror retracting mechanism 16 between a deployed position where the door mirror 14 is protruded sideway from the side surface of the vehicle body, that is, the position assumed during the normal running of the vehicle, and a retracted position where the door mirror 14 is not protruded sideway, that is, the position assumed when the vehicle is parked or the like. The deployed position and the retracted position of the door mirror 14 are pre-set so as to maintain a predetermined relative positional relationship, more specifically, a relationship where the angle difference between the two positions viewed from above the vehicle is, for example, 70°.

The camera 10 has an optical axis that is directed downward from the door mirror 14 for taking images of a predetermined region that extends below the door mirror 14, that is, a blind spot invisible to a vehicle driver, including a vehicle body side surface as well. The camera 10, whose position relative to the vehicle body changes with changes in the operating position of the door mirror 14, takes pictures so that at least a portion of the picture shot area provided when the door mirror 14 is in the deployed position and at least a portion of the picture shot area provided when the door mirror 14 is in the retracted position each include a vehicle body side surface, and overlap with each other, and include a common region.

The camera 10 is connected to a monitor-purposed electronic control computer (hereinafter, simply referred to as "control computer") 20. The vehicular image display apparatus of the embodiment is controlled by the control computer 20. The control computer 20 has an image input portion 22, an image storage memory 24, an image transform processing portion 26, an image output monitoring portion 28, and an image output portion 30.

The taken image acquired as a result of the picture shooting performed by the camera 10 is supplied to the image input portion 22 of the control computer 20. The images taken by the camera 10 are input to the image input portion 22 at time intervals of, for example, 30 ms. The information regarding camera-taken images input to the image input portion 22 is supplied to the image storage memory 24. The image storage memory 24 temporarily stores images taken by the camera 10. The camera-taken images stored in the image storage memory 24 are input to the image transform processing portion 26. The image transform processing portion 26 is electrically connected to the mirror retracting mechanism 16, and is supplied with information therefrom that indicates whether the operating position of the door mirror 14 is the deployed position or the retracted position. The image transform processing portion 26 determines which one of the deployed position and the retracted position is the present operating position of the door mirror 14 on the basis of the information from the mirror retracting mechanism 16. The image transform processing portion 26 also executes a process of partially extracting a region from the image taken by the camera 10 in a below-described manner corresponding to the operating position of the door mirror 14.

The image information provided by the process of the image transform processing portion 26 is supplied to the image output portion 30. A display 12 is connected to the control computer 20. The display 12 has a predetermined-size screen that is disposed in a console or the like within a vehicle compartment so that the screen is visible to vehicle occupants. The image output portion 30 drives the display 12 so that a camera-taken image supplied from the image transform processing portion 26 is displayed on the display 12 if a display request is made by a vehicle driver, or if the vehicle is in a predetermined state of run or a predetermined state of operation, or the like. The display 12 displays the camera-taken image supplied from the image output portion 30.

The image output monitoring portion 28 monitors the state of image output from the image output portion 30 to the display 12 via a watchdog timer, so as to detect an abnormal state caused by image fixation in which the output image remains unchanged for more than a predetermined time. If the abnormal state is detected, the image output monitoring portion 28 resets the image storage memory 24 and the image transform processing portion 26. After the image storage memory 24 and the image transform processing portion 26 are reset, the processing of the image input from the camera 10 into the image input portion 22 is restarted, thereby realizing a failsafe function for preventing the image fixation in the display 12.

A manual adjustment switch 32 is connected to the control computer 20. The manual adjustment switch 32 is provided so that the manual adjustment switch 32 can be operated by a vehicle occupant or can be temporarily operated by a working person at the time of assembly of the vehicle, repair thereof, etc. Information regarding the state of the manual adjustment switch 32 is supplied to the image transform processing portion 26 of the control computer 20. The manual adjustment switch 32 is provided so that the region to be extracted from a camera-taken image in the image transform processing portion 26 can be changed by manually operating the switch 32. The image transform processing portion 26 executes a process of extracting a region from a camera-taken image in accordance with the state of the manual adjustment switch 32 as well.

Figure 2A:
FIGS. 2A and 2B illustrate a shot area covered by a camera when an outer mirror is in a deployed position.
Figure 2B:
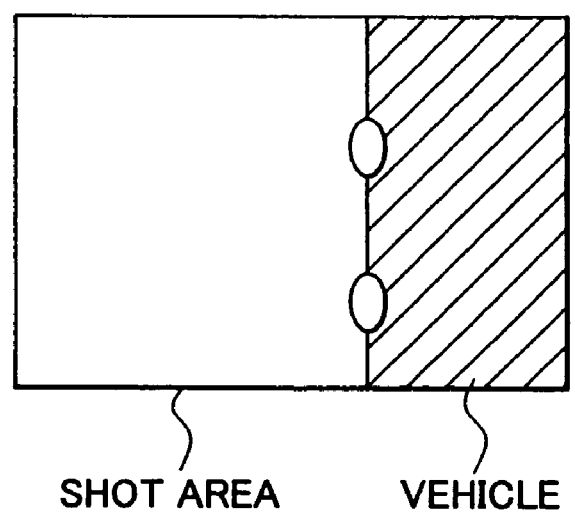
Figure 3A:
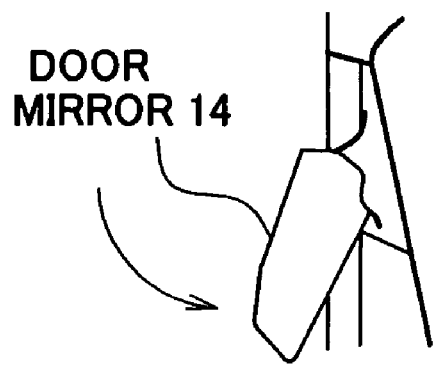
FIGS. 3A and 3B illustrate a shot area covered by the camera when the outer mirror is in a retracted position.
Figure 3B:
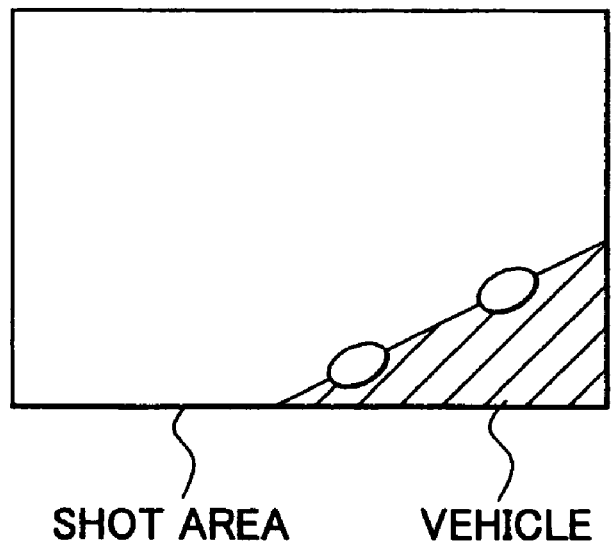

FIGS. 2A and 2B illustrate the deployed position of the door mirror 14 and the picture shot area covered by the camera 10 when the door mirror 14 is in the deployed position. FIGS. 3A and 3B illustrate the retracted position of the door mirror 14 and the picture shot area covered by the camera 10 when the door mirror 14 is in the retracted position. That is, FIGS. 2A and 3A schematically show the states of the door mirror 14 in the two operating positions, that is, the deployed position and the retracted position, respectively. FIGS. 2B and 3B indicate the picture shot areas of the camera 10 corresponding to the two operating positions.

The camera 10 is disposed on the door mirror 14, whose operating position can be changed, as described above. Therefore, the position of the camera 10 relative to the vehicle body changes in accordance with changes in the operating position of the door mirror 14. Hence, as illustrated in FIGS. 2A, 2B, 3A and 3B, the picture shot area covered by the camera 10 when the door mirror 14 is in the deployed position and the picture shot area covered by the camera 10 when the door mirror 14 is in the retracted position are different from each other in such a fashion corresponding to the angle difference between the deployed position and the retracted position of the door mirror 14 in a view from above the vehicle.

If the image displayed on the display 12 is always the image of a predetermined region in the picture shot area regardless of the operating position of the door mirror 14 although the picture shot area of the camera 10 changes in accordance with changes in the operating position of the door mirror 14, the direction of the main axis of a camera-taken image in the screen of the display 12 with respect to the vehicle body appearing in the displayed image, that is, the traveling direction of the vehicle in the screen of the display 12, is different between when the door mirror 14 is in the deployed position and when the door mirror 14 is in the retracted position. In this arrangement, therefore, the traveling direction of the vehicle in the screen of the display 12 does not remain fixed despite changes in the operating position of the door mirror 14, so that a vehicle occupant, viewing the display 12, is likely to have incorrect recognition of the vehicle-surrounding environment.

Therefore, in order to avoid this drawback, the system of this embodiment is characterized in that the data regarding images taken by the camera 10 is electronically processed so as to keep the traveling direction of the vehicle fixed in the screen of the display 12 regardless of changes in the operating position of the door mirror 14. Features of this embodiment will be described with reference to FIGS. 4A to 6.

Figure 4A:
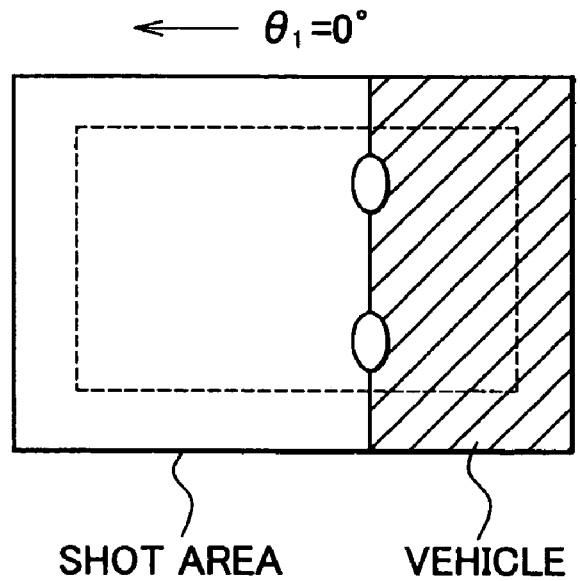
FIGS. 4A and 4B are diagrams illustrating a technique of extracting a region to be displayed on a display means from the data regarding a shot image area taken by the camera when the outer mirror is in the deployed position.
Figure 4B:
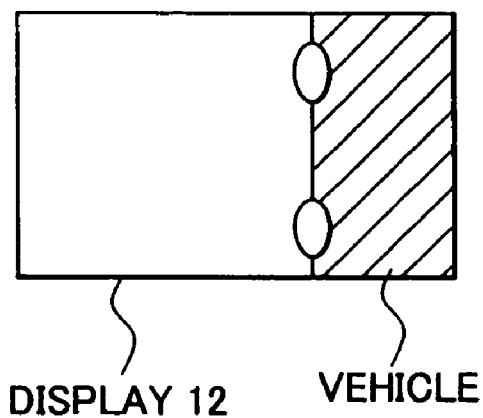
Figure 5A:
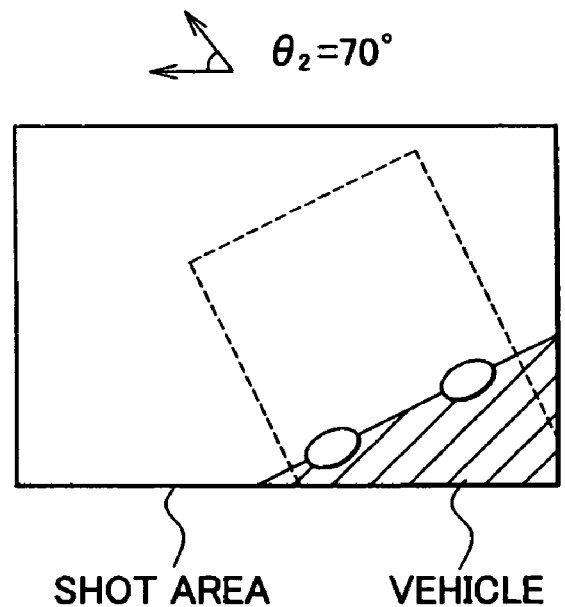
FIGS. 5A and 5B are diagrams illustrating a technique of extracting a region to be displayed on a display means from the data regarding a shot image area taken by the camera when the outer mirror is in the retracted position.
Figure 5B:
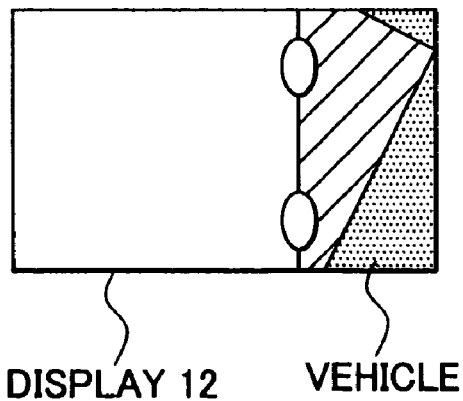

FIGS. 4A and 4B illustrate a technique of extracting a region to be displayed on the display 12 from the data regarding a shot image area taken by the camera 10 when the door mirror 14 is in the deployed position in accordance with this embodiment. FIGS. 5A and 5B illustrate a technique of extracting a region to be displayed on the display 12 from the data regarding a hot image area taken by the camera 10 when the door mirror 14 is in the retracted position in accordance with this embodiment. That is, FIGS. 4A and 5A indicate the shot areas of the camera 10, and FIGS. 4B and 5B indicate the screen images produced by the display 12. In each of FIGS. 4A and 5A, the region to be extracted from the entire shot area of the image shot by the camera 10 so as to be displayed on the display 12 is indicated by a dotted line.

In this embodiment, the information regarding images acquired as a result of the picture shooting performed by the camera 10 is input to the image input portion 22 of the control computer 20, and is then stored into the image storage memory 24 and is input to the image transform processing portion 26. The image transform processing portion 26 determines which one of the deployed position and the retracted position is the present operating position of the door mirror 14, as described above. Furthermore, the image transform processing portion 26 partially extracts a rectangular region to be displayed on the display 12 from the entire shot area of the input image in accordance with the determined operating position of the door mirror 14. The region partially extracted has a size that matches the size of the screen of the display 12.

Corresponding to the operating positions of the door mirror 14, the image transform processing portion 26 makes the angular direction of the region partially extracted from the entire shot area of the input image at the time of the deployed position of the door mirror 14 and the angular direction of the region partially extracted from the entire shot area of the input image at the time of the retracted position of the door mirror 14 different from each other by an angle equal to the angle difference (e.g., 70°) between the deployed position and the retracted position of the door mirror 14, and makes the centers of gravity of the extracted regions different from each other by an amount corresponding to the difference between the positions of the camera 10 relative to the vehicle body.

Specifically, if it is determined that the door mirror 14 is in the deployed position, the image transform processing portion 26 partially extracts a substantially central portion of the picture shot area (the region surrounded by a dotted line in FIG. 4A) which has a predetermined angle θ1 (θ1=0° in FIG. 4A) with respect to the shot area of the input image. If it is determined that the door mirror 14 is in the retracted position, the image transform processing portion 26 partially extracts a region (region surrounded by a dotted line in FIG. 5A) that has a predetermined angle θ2 (θ2=7° in FIG. 5A) to the shot area of the input image which differs from the angle θ1 by an amount of angle equal to the angle difference between the deployed position and the retracted position of the door mirror 14, and that centers at a point that is apart from the center of the shot area by an amount corresponding to the difference between the two positions of the camera 10 relative to the vehicle body Extraction of such regions is performed so that each extracted region includes a portion of the vehicle side surface that appears in the input shot image. After that, the extracted region is rotated by the aforementioned angle θ1 or θ2 of extraction (the region indicated in FIG. 5A is rotated counterclockwise by θ2).

The image information regarding the region extracted by the image transform processing portion 26 is supplied to the image output portion 30. The image output portion 30 displays the image of the rectangular region extracted by the image transform processing portion 26 from the entire image shot by the camera 10 in the screen of the display 12 in such a manner that the displayed image conforms to the screen. If the aforementioned extraction results in a need to display a region extending outside the area shot by the camera 10, the extracted region of the taken image is magnified so that the display screen is filled with the extracted region and such a non-picture shot region does not appear in the screen, or the extracted region of the taken image is simply displayed with the non-picture shot region being masked as indicated by a dot pattern in FIG. 5B.

In the construction of the embodiment, the image displayed on the display 12 during the retracted state of the door mirror 14 is relatively rotated with respect to an image displayed during the deployed state of the door mirror 14. The angle of this rotation corresponds to the angle difference between the deployed position and the retracted position of the door mirror 14. Therefore, the direction of the main axis of each camera-shot image displayed on the display 12 when the door mirror 14 is in the deployed position and the direction of the main axis of each camera-shot image displayed on the display 12 when the door mirror 14 is in the retracted position, that is, the traveling directions of the vehicle indicated in the screen of the display 12 during the deployed state of the door mirror 14 and during the retracted state thereof, coincide with each other in the screen of the display 12, for example, both upward as indicated in FIGS. 4B and 5B. That is, the direction of the main axis of camera-taken images displayed on the display 12 with respect to the vehicle appearing in the displayed images remains fixed regardless of the operating positions of the door mirror 14.

Figure 6:
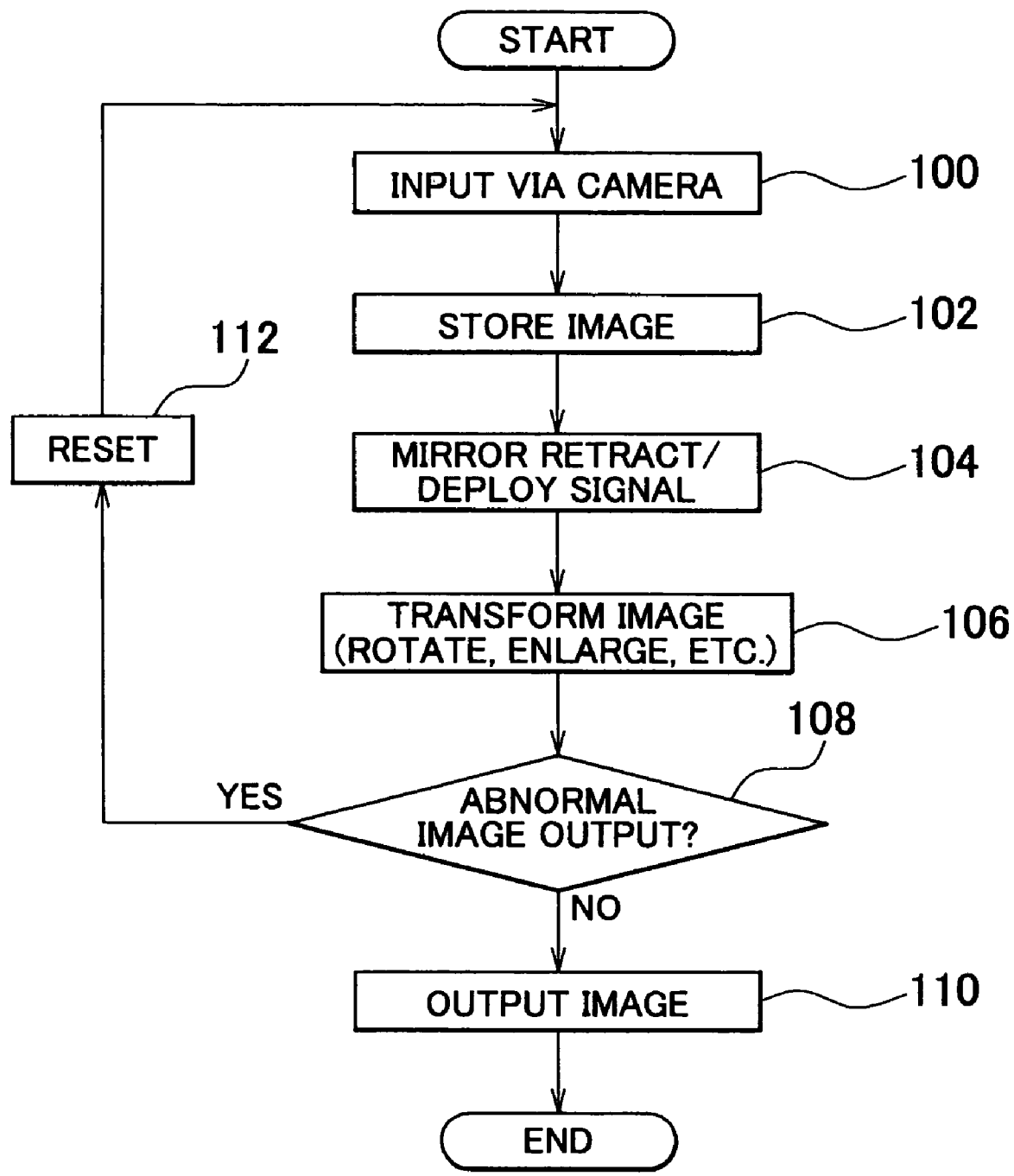
FIG. 6 is a flowchart illustrating a control routine executed by the vehicular image display apparatus of the embodiment.

FIG. 6 is a flowchart illustrating a control routine executed by the control computer 20 in this embodiment so as to achieve the above-described functions. The routine illustrated in FIG. 6 is repeatedly activated at every predetermined time (e.g., 30 ms). After the routine is activated, the process of step 100 is first executed.

In step 100, an image shot by the camera 10 is input to the image input portion 22. Subsequently in step 102, the camera-shot image input to the image input portion 22 in step 100 is stored into the image storage memory 24. In step 104, it is determined in the image transform processing portion 26 which one of the deployed position and the retracted position is the present operating position of the door mirror 14 on the basis of the information from the mirror retracting mechanism 16.

In step 106, the image transform processing portion 26 partially extracts a rectangular region to be displayed on the display 12 from the entire shot area of the image taken by the camera 10, in a fashion corresponding to the operating position of the door mirror 14 determined in step 104. The extracted image is subjected to a rotating process. Thus, the image transform processing portion 26 performs a camera-shot image transforming process.

In step 108, the image output monitoring portion 28 determines whether the image output to the display 12 is in an abnormal state. If the determination in step 108 is negative, the process proceeds to step 110. Conversely, if the determination is affirmative, the process proceeds to step 112.

In step 110, the image output portion 30 outputs the camera-taken image acquired as a result of the transform executed in step 106, to the display 12. Due to the process in step 110, images acquired via the camera 10 are displayed on the display 12 in fashions corresponding to the operating positions of the door mirror 14. The end of the process of step 110 is followed by the end of the present execution of the routine.

In step 112, the image storage memory 24 and the image transform processing portion 26 are reset in order to delete the information regarding camera-shot images stored in the image storage memory 24 and results of the processing performed by the image transform processing portion 26. After the process of step 112 ends, the process starting at step 100 is executed. After that, the process is restarted when a camera-shot image input to the image input portion 22 is newly input to the image storage memory 24 and the image transform processing portion 26.

According to the routine illustrated in FIG. 6, regions corresponding to the operating positions of the door mirror 14 can be partially extracted from the entire shot areas of images acquired via the camera 10, and can be displayed on the display 12. The angular direction of an extracted region with respect to the entire shot area at the time of the deployed position of the door mirror 14 and the angular direction of an extracted region with respect to the entire shot area at the time of the retracted position of the door mirror 14 are different from each other by an angle equal to the angle difference between the deployed position and the retracted position of the door mirror 14, so that the images of the extracted regions will be displayed in fashions conforming to the screen of the display 12.

Therefore, in the vehicular image display apparatus of this embodiment, a portion of the shot area of an image taken by the camera 10 during the deployed state of the door mirror 14 and a portion of the shot area of an image taken by the camera 10 during the retracted state of the door mirror 14 include a vehicle body side surface and overlap with each other. Furthermore, in the embodiment, the direction of the main axis of a camera-taken image displayed in the screen of the display 12 with respect to the vehicle body appearing in the displayed taken image during the deployed state of the door mirror 14 and the direction of the main axis of a camera-taken image displayed in the screen of the display 12 with respect to the vehicle body appearing in the displayed taken image during the retracted state of the door mirror 14 coincide with each other, that is, the traveling directions of the vehicle indicated in the screen of the display 12 during the two states of the door mirror 14 coincide with each other. Therefore, the vehicular image display apparatus of this embodiment is able to maintain a fixed direction of the main axis of camera-taken images displayed in the screen of the display 12 with respect to the vehicle body appearing in the displayed taken images, regardless of the operating positions of the door mirror 14.

In the construction of the embodiment, the process in which the vehicle traveling directions appearing in the screen of the display 12 during the deployed position and during the retracted position of the door mirror 14 are made to coincide with each other is accomplished by the control computer 20 performing electronic transform of images shot by the camera 10. This construction accomplishes the aforementioned process more easily than a construction that employs a mechanical device connected to the door mirror 14 and the camera 10 for accomplishing the process. Therefore, the construction of the embodiment allows a reduction in the number of component parts and a reduction in cost. That is, the embodiment makes it possible to easily realize the function of maintaining a fixed direction of the main axis of camera-taken images displayed in the screen of the display 12 with respect to the vehicle body appearing in the displayed taken images, regardless of the operating positions of the door mirror 14.

If the vehicle traveling direction appearing in the screen of the display 12 remains the same before and after a change in the operating position of the door mirror 14, a vehicle occupant can continue to have appropriate visual recognition of the surroundings of the vehicle without a disagreeable perception before and after a change in the operating position of the door mirror 14. Therefore, the vehicular image display apparatus of this embodiment is able to present camera-taken images of surroundings of the vehicle to a vehicle occupant in an easy-to-recognize fashion, and is able to prevent degradation in the legibility of camera-taken images displayed on the display 12 when the operating position of the door mirror 14 where the camera 10 is disposed changes between the deployed position and the retracted position.

According to the routine illustrated in FIG. 6, the image storage memory 24 or the image transform processing portion 26 can be reset if an image fixation-caused abnormal state regarding images output to the display 12 is detected during the process of storing image data into the image storage memory 24 or the process of transform executed by the image transform processing portion 26. After the reset, the process of storing camera-shot images into the image storage memory 24 or the transforming process of the image transform processing portion 26 is restarted. Therefore, the vehicular image display apparatus of the embodiment is able to prevent long-time fixation of a camera-taken image on the display 12.

Furthermore, in the vehicular image display apparatus of the embodiment, the image transform processing portion 26 executes the process of partially extracting a region corresponding to the operating position of the door mirror 14 from an image shot by the camera 10, and also executes a process of partially extracting a region corresponding to the state of the manual adjustment switch 32 operated by a person. The manual adjustment switch 32 allows the arbitrary changing of the region partially extracted from the entire shot area of an image taken by the camera 10. Specifically, by operating the manual adjustment switch 32, it is possible to substantially freely change the center of the region to be extracted and the angel of the region with respect to the shot area of the image while maintaining the size of the extracted region. Then, information regarding the image of the extracted region is supplied to the image output portion 30, and is displayed in a fashion conforming to the screen of the display 12.

In this construction, if there occurs a mounting deviation of the door mirror 14 with respect to the vehicle body or a mounting deviation of the camera 10 with respect to the door mirror 14 or the like, the deviation can be absorbed or eliminated afterwards through an electronic process of corrective transform of camera-shot images performed in the control computer 20. Therefore, according to the vehicular image display apparatus of this embodiment, even if the door mirror 14 or the camera 10 has a mounting deviation, the deviation of camera-taken images on the display 12 caused by the mounting deviation can be easily corrected, for example, in such a manner that the vehicle traveling direction becomes upward in the screen of the display 12 without fail.

Although the display direction and position of camera-taken images on the display 12 are preset as initial setting, the above-described construction allows the display direction and position of camera-taken images on the display 12 to be adjusted to a direction and a position desired by a vehicle occupant if the occupant operates the manual adjustment switch 32. Therefore, the vehicular image display apparatus of the embodiment is able to accomplish the displays of camera-taken images that suit the preferences of vehicle occupants, for example, in such a fashion that the vehicle traveling direction is diagonally upward or horizontal in the screen of the display 12.

In the embodiment, the door mirror 14 corresponds to a "movable portion" mentioned in the invention. Likewise, the display 12 corresponds to a "display means", and the deployed position and the retracted position of the door mirror 14 correspond to a "first position" and a "second position", and the manual adjustment switch 32 corresponds to a "manual adjustment means" mentioned in the invention. Furthermore, the image transform processing portion 26 of the control computer 20 realizes a "display control means" mentioned in the invention since the image transform processing portion 26 executes the processes of steps 106 and 110 in the routine illustrated in FIG. 6.

Although, in the foregoing embodiment, the region extracted partially from the entire shot area of an image shot by the camera 10 has a rectangular shape, the invention is not limited so, that is, the shape of the extracted region may be circular, elliptic or the like.

Although, in the foregoing embodiment, the camera 10 is disposed in the door mirror 14, that is, a movable portion whose operating position is changeable, the invention is not limited so. For example, the invention is also applicable to constructions in which the camera 10 is disposed on a site or member other than the door mirror 14 which is movable relatively to the vehicle body, for example, a door, a bonnet, a trunk, etc.

Furthermore, although, in the foregoing embodiment, the direction of the main axis of camera-taken images displayed in the screen of the display 12 with respect to the vehicle body appearing in the displayed images is kept unchanged despite the positional change of the door mirror 14 between the deployed position and the retracted position, it is also possible to maintain a fixed direction of the main axis of camera-taken images displayed in the screen of the display 12 with respect to the vehicle body appearing in the displayed images during the entire process of positional change of the door mirror 14 from the deployed position to the retracted position and during the entire process thereof from the retracted position to the deployed position.

In this case, the turning angle of the door mirror 14 between the deployed position and the retracted position is detected at every predetermined time, and the region extracted partially from the entire shot area of an image shot by the camera 10 is changed in accordance with the detected turning angle, and the image of the extracted region is displayed in a fashion conforming to the screen of the display 12. In another modification, the time elapsing during the positional change of the door mirror 14 between the deployed position and the retracted position is stored in a memory beforehand. The region extracted partially from the entire shot area of an image shot by the camera 10 is changed in accordance with the elapsed time following the beginning of positional change of the door mirror 14, and the image of each extracted region is displayed in a fashion conforming to the screen of the display 12.

According to this construction, the direction of the main axis of camera-taken images displayed in the screen of the display 12 with respect to the vehicle body appearing in the displayed images can be kept fixed regardless of changes in the operating position of the door mirror 14 during the positional change thereof from the deployed position to the retracted position and during the positional change from the retracted position and the deployed position. Therefore, it is possible to prevent deterioration in the legibility of camera-taken images displayed on the display 12 before and after a change in the operating position of the door mirror 14.

In another possible construction, display of an image taken by the camera 10 on the display 12 is entirely avoided during the process of positional change of the door mirror 14 from the deployed position to the retracted position and during the process of positional change thereof from the retracted position to the deployed position (the fact that the door mirror 14 is being moved may be indicated on the display 12 through the use of synthesized letters and the like), and it is only after completion of the positional change of the door mirror 14 that a camera-taken image corresponding to the operating position assumed by the door mirror 14 is displayed on the display 12.

According to the embodiment of the invention, the direction of the main axis of camera-taken images displayed on the display means with respect to the vehicle body appearing in the displayed images can be kept unchanged regardless of changes in the operating position of a movable portion of the vehicle where the camera is disposed. Therefore, according to the embodiment, it is possible to prevent deterioration in the legibility of displayed camera-taken images from being caused by a change in the operating position of the movable portion of the vehicle where the camera is disposed.

Furthermore, the direction of the main axis of camera-taken images displayed on the display means with respect to the vehicle body appearing in the displayed images can be adjusted in accordance with the operation performed by a vehicle occupant.

What is claimed is:

1. A vehicular image display apparatus comprising:
   a camera disposed on a movable portion of a vehicle, wherein an operating position of the movable portion is selectively changeable between a first position and a second position and a relative position and orientation of the camera with respect to a vehicle body changes in accordance with the operating position of the movable portion;
   a controller that extracts a portion of a taken image data representing a taken image of surroundings of the vehicle taken by the camera, the taken image having the same orientation with respect to the vehicle body as the camera; and
   a display device on which an extracted image represented by the extracted portion of the taken image data is displayed visible to a vehicle occupant,
   wherein an orientation with respect to the vehicle body of the extracted image is different from either an orientation with respect to the vehicle body of the taken image taken when the camera is in the first position or an orientation with respect to the vehicle body of the taken image taken when the camera is in the second position so that an orientation of the vehicle body in the extracted image is the same regardless of whether the taken image is taken when the camera is in the first position or in the second and
   wherein an angular difference between an angular position of the extracted portion of the taken image with respect to the vehicle body when the camera is in the first position and an angular position of the extracted portion of the taken image with respect to the vehicle body when the camera is in the second position corresponds to an angular difference between an angular position of the movable portion in the first position with respect to the vehicle body and an angular position of the movable portion in the second position with respect to the vehicle body.

2. The vehicular image display apparatus according to claim 1, further comprising a manual adjustment device that changes the orientation of the extracted image with respect to the vehicle body through an operation performed by the vehicle occupant.

3. The vehicular image display apparatus according to claim 1, further comprising a manual adjustment device that changes the angular position of the extracted image with respect to the vehicular body through an operation performed by the vehicle occupant.

4. The vehicular image display apparatus according to claim 1, wherein the movable portion is an outer mirror whose operating position is selectively changeable between a deployed position and a retracted position.

5. The vehicular image display apparatus according to claim 1, further comprising:
   a memory device that stores the taken image data; and
   a monitoring device that determines whether there is an abnormality in the extracted image,
   wherein if it is determined that there is an abnormality in the extracted image, the taken image data stored in the memory device is reset.

6. A vehicular image display method that takes a taken image of surroundings of a vehicle taken via a camera disposed on a movable portion of the vehicle, wherein an operating position of the movable portion is selectively changeable between a first position and a second position and a relative position and orientation of the camera with respect to a vehicle body changes in accordance with the operating position of the movable portion, the taken image being represented by taken image data, the method being characterized by further comprising the steps of:
   extracting a portion of the taken image data corresponding to a region of the taken image, the region being selected based on the operating position of the movable portion; and
   displaying the region of the taken image on a display device visible to a vehicle occupant,
   wherein an orientation of the extracted region of the taken image with respect to the vehicle body is different from either an orientation with respect to the vehicle body of the taken image taken when the camera is in the first position or an orientation with respect to the vehicle body of the taken image taken when the camera is in the second position so that an orientation of the vehicle body in the extracted region of the taken image is the same regardless of whether the taken image is taken when the camera is in the first position or in the second position, and
   wherein an angular difference between an angular position of the extracted region of the taken image with respect to the vehicle body when the camera is in the first position and an angular position of the extracted region of the taken image with respect to the vehicle body when the camera is in the second position corresponds to an angular difference between an angular position of the movable portion in the first position with respect to the vehicle body and an angular position of the movable portion in the second position with respect to the vehicle body.

7. The vehicular image display method according to claim 6, further comprising the steps of:
storing the taken image as taken image data; and
determining whether there is an abnormality in the extracted region of the taken image displayed on the display device, and resetting the taken image data stored in the memory device if it is determined that there is an abnormality in the extracted region of the taken image.

8. A vehicular image display apparatus comprising:
a camera disposed on a movable portion of a vehicle, wherein an operating position of the movable portion is selectively changeable between a first position and a second position and a relative position and orientation of the camera with respect to a vehicle body changes in accordance with the operating position of the movable portion;
display control means for extracting a region of a taken image of surroundings of the vehicle taken by the camera, the region being selected based on the operating position of the movable portion; and
display means on which the extracted region of the taken image is displayed visible to a vehicle occupant,
wherein an orientation of the extracted region of the taken image with respect to the vehicle body is different from either an orientation with respect to the vehicle body of the taken image taken when the camera is in the first position or an orientation with respect to the vehicle body of the taken image taken when the camera is in the second position so that an orientation of the vehicle body in the extracted region of the taken image is the same regardless of whether the taken image is taken when the camera is in the first position or in the second position,
wherein an angular difference between an angular position of the extracted region of the taken image with respect to the vehicle body when the camera is in the first position and an angular position of the extracted region of the taken image with respect to the vehicle body when the camera is in the second position corresponds to an angular difference between an angular position of the movable portion in the first position with respect to the vehicle body and an angular position of the movable portion in the second position with respect to the vehicle body.

9. The vehicular image display apparatus according to claim 1, wherein a size of the extracted image is matched to a size of a screen of the display device such that if the size of the extracted image is less than the size of the screen, the extracted image is magnified so that the screen of the display device is filled with only the extracted image or a portion of the taken image that is not extracted is masked out and not displayed.

10. The vehicular image display method according to claim 6, further comprising the step of matching a size of the extracted region of the taken image with a size of a screen of the display device such that if the extracted region of the taken image is less than the size of the screen, the extracted region of the taken image is magnified so that the screen of the display device is filled with only the extracted region of the taken image or a portion of the taken image outside of the extracted region of the taken image is masked out and not displayed.

11. The vehicular image display apparatus according to claim 8, wherein a size of the extracted region of the taken image is matched to a size of a screen of the display device such that if the size of the extracted region of the taken image is less than the size of the screen, the extracted region of the taken image is magnified so that the screen of the display device is filled with only the extracted region of the taken image or a portion of the taken image outside of the extracted region of the taken image is masked out and not displayed.

12. A vehicular image display apparatus comprising:
a camera disposed on a movable portion of a vehicle, wherein an operating position of the movable portion is selectively changeable between a first position and a second position and a relative position and orientation of the camera with respect to a vehicle body changes in accordance with the operating position of the movable portion;
a controller that extracts a region of a taken image of surroundings of the vehicle taken by the camera, the region being selected based on the operating position of the movable portion; and
a display device on which the extracted region of the taken image is displayed visible to a vehicle occupant,
wherein an orientation of the extracted region of the taken image with respect to the vehicle body is different from either an orientation with respect to the vehicle body of the taken image taken when the camera is in the first position or an orientation with respect to the vehicle body of the taken image taken when the camera is in the second position so that an orientation of the vehicle body in the extracted region of the taken image is the same regardless of whether the taken image is taken when the camera is in the first position or in the second position,
wherein an angular difference between an angular position of the extracted region of the taken image with respect to the vehicle body when the camera is in the first position and an angular position of the extracted region of the taken image with respect to the vehicle body when the camera is in the second position corresponds to an angular difference between an angular position of the movable portion in the first position with respect to the vehicle body and an angular position of the movable portion in the second position with respect to the vehicle body.

13. The vehicular image display apparatus according to claim 12, further comprising a manual adjustment device that changes the direction of the orientation of the extracted region of the taken image with respect to the vehicle body through an operation performed by the vehicle occupant.

14. The vehicular image display apparatus according to claim 12, further comprising a manual adjustment device that changes the angular position of the extracted region of the taken image with respect to the vehicle body through an operation performed by the vehicle occupant.

15. The vehicular image display apparatus according to claim 12, wherein the movable portion is an outer mirror whose operating position is selectively changeable between a deployed position and a retracted position.

16. The vehicular image display apparatus according to claim 12, further comprising:
a memory device that stores the taken image data; and
a monitoring device that determines whether there is an abnormality in the extracted region of the taken image, wherein if it is determined that there is an abnormality in the extracted region of the taken image, the taken image data stored in the memory device is reset.

17. The vehicular image display apparatus according to claim 12, wherein a size of the extracted region of the taken image is matched to a size of a screen of the display device such that if the extracted region of the taken image is less than the size of the screen, the extracted region of the taken image is magnified so that the screen of the display device is filled with only the extracted region of the taken image or a portion of the taken image outside of the extracted region of the taken image is masked out and not displayed.

18. A vehicular image display method that takes a taken image of surroundings of a vehicle taken via a camera disposed on a movable portion of the vehicle, wherein an operating position of the movable portion is selectively changeable between a first position and a second position and a relative position and orientation of the camera with respect to a vehicle body changes in accordance with the operating position of the movable portion, the taken image being represented by taken image data, the method being characterized by further comprising the steps of
   extracting a portion of the taken image data corresponding to a region of the taken image, the region being selected based on the operating position of the movable portion,
   displaying the region of the taken image on a display device visible to a vehicle occupant,
   wherein an angular difference between an angular position of the extracted region of the taken image with respect to the vehicle body when the camera is in the first position and an angular position of the extracted region of the taken image with respect to the vehicle body when the camera is in the second position corresponds to an angular difference between an angular position of the movable portion in the first position with respect to the vehicle body and an angular position of the movable portion in the second position with respect to the vehicle body.

19. The vehicular image display method according to claim 18, further comprising:
   storing the taken image data; and
   determining whether there is an abnormality in the extracted region of the taken image, and resetting the taken image data stored in the memory device if it is determined that there is an abnormality in the extracted region of the taken image.

20. The vehicular image display method according to claim 18, further comprising the step of matching a size of the extracted region of the taken image with a size of a screen of the display device such that if the extracted region of the taken image is less than the size of the screen, the extracted region of the taken image is magnified so that the screen of the display device is filled with only the extracted region of the taken image or a portion of the taken image outside of the extracted region of the taken image is masked out and not displayed.

21. A vehicular image display apparatus comprising:
   a camera disposed on a movable portion of a vehicle, wherein an operating position of the movable portion is selectively changeable between a first position and a second position and a relative position and orientation of the camera with respect to a vehicle body changes in accordance with the operating position of the movable portion;
   display control means for extracting a region of a taken image of surroundings of the vehicle taken by the camera, the region being selected based on the operating position of the movable portion
   display means on which the extracted region of the taken image is displayed visible to a vehicle occupant,
   wherein an angular difference between an angular position of the extracted region of the taken image with respect to the vehicle body when the camera is in the first position and an angular position of the extracted region of the taken image with respect to the vehicle body when the camera is in the second position corresponds to an angular difference between an angular position of the movable portion in the first position with respect to the vehicle body and an angular position of the movable portion in the second position with respect to the vehicle body.

22. The vehicular image display apparatus according to claim 21, wherein a size of the extracted region of the taken image is matched to a size of a screen of the display device such that if the extracted region of the taken image is less than the size of the screen, the extracted region of the taken image is magnified so that the screen of the display device is filled with only the extracted region of the taken image or a portion of the taken image outside of the extracted region of the taken image is masked out and not displayed.

* * * * *